United States Patent [19]

Barth et al.

[11] 3,942,391

[45] Mar. 9, 1976

[54] DRIVER PROTECTION IN MOTOR VEHICLES

[76] Inventors: Mathias Otto Barth; Inge Magel, both of Essener Str. 14, 1 Berlin 21, Germany

[22] Filed: Mar. 11, 1974

[21] Appl. No.: 449,967

[30] Foreign Application Priority Data
Mar. 15, 1973  Germany............................ 2312843

[52] U.S. Cl............... 74/552; 280/87 R; 280/150 B
[51] Int. Cl.²....................... B62D 1/04; B62D 1/08
[58] Field of Search...................... 74/552, 492, 493; 280/150 B, 87 R

[56] References Cited
UNITED STATES PATENTS

| | | | |
|---|---|---|---|
| 3,172,683 | 3/1965 | D'Antini............................ | 74/552 X |
| 3,507,165 | 4/1970 | Wilfert et al...................... | 74/552 X |
| 3,528,314 | 9/1970 | Barenyi................................ | 74/552 |
| 3,583,255 | 6/1971 | Curcuru............................... | 74/552 |

*Primary Examiner*—Samuel Scott
*Assistant Examiner*—F. D. Shoemaker
*Attorney, Agent, or Firm*—Ralf H. Siegemund

[57] ABSTRACT

A bio-mechanical impact protection is provided in a depressed steering wheel wherein a shock absorbing element is tiltably mounted on the steering wheel hub for tilting into frontal disposition if the steering wheel is bent down on impact. In the frontal disposition the element intercepts the horizontally accelerated and propelled driver in flat surface-to-surface contact, offering the full-thickness of the element for compression and impact energy dissipation.

11 Claims, 9 Drawing Figures

DRIVER PROTECTION IN MOTOR VEHICLES

BACKGROUND OF THE INVENTION

The present invention relates to a steering wheel for motor vehicles and having a rim and depressed hub above which is disposed a restraining device for impact protection, through absorbtion and dissipation of impact shock.

Restraining and protection devices arranged in the steering wheel are specifically designed to protect the driver of a car, when not having the seat belts fastened, against injuries in the case of a collision at low or medium speeds. The restraining device in the steering wheel will not only protect the upper part of the body, particularly the chest of the driver, but should also prevent his head from being thrown against the windshield. If the driver has the seat belts fastened, the restraining device is particularly of interest for collision at medium and high speeds, avoiding injury through the seat belts particularly when strained up to the limit of elastic extension. Particularly in the latter case the driver's head could still hit e.g. the steering wheel unless the restraining device intercepts the motion of the head towards the wheel rim.

Shock energy absorbing and dissipating devices are known in considerable varieties as part of the effort to provide for passively working protection of the driver. For example, impact absorbers are disposed between steering wheel and column, and the hub is frequently cushioned by means of rather thin foam parts. One has also tried to place cylindrical, metallic elements on the hub, which elements may be deformed rather easily, but not too easily, so that deformation, even crushing, does absorb impact energy. These elements are additionally provided with a foam cover.

Other types of steering wheels have several rims, arranged one above another and connected to the hub so that upon impact they undergo deformation in particular sequence for sequentially dissipating the impact shock. Other energy dissipating devices have mushroom-shaped configuration and are of laminated construction with several, differently stiff, plastic lamina for energy dissipation and absorbtion. Another proposal relates to dish-shaped steering wheels wherein a thick and large impact absorber made of cellular material is disposed in the dish.

All these various devices are deficient in one way or another and do not provide adequate protection nor do they prevent injuries with a sufficient degree of certainty.

We have discovered that one of the reasons for the inadequate protection afforded by the known devices is to be seen in the orientation of the impact surface of the protecting device in relation to the most likely direction of impact by a body part of the driver. Ideally, the latter direction should be at right angles particularly in the instant of impact. In such a case, the body part would engage the surface of the restaining device immediately over a large area, and the interaction between the body part and the device while causing deformation of the device over a large zone, would not dangerously react against the body part in a localized, focusing effect. This case can be regarded as constituting the most favorable bio-mechanical situation for alleviating the danger of injury.

However, the situation is quite different in practice. The displacement of the driver on impact is in the horizontal direction, particularly when the driver is seated in front of the steering wheel which is obliquely disposed to him as well as to the direction of displacement and impact. Thus, the ideal situation as far as impact protection is concerned is not realizable per se.

The French patent No. 1,090,586 discloses an impact protection device wherein in correspondence to the wheel rim deformation the protecting device becomes vertically oriented to meet the horizontally accelerated driver. The device however is very complicated, expensive and does not dissipate a sufficient amount of impact energy which feature, however, is the primary prerequisite for the prevention of injuries.

Another approach to the problem is to provide for a deformable steering wheel support on the column so that upon impact the angle of the steering wheel increases. Such an arrangement provides for some improvement but it requires that the steering wheel is no longer operatively connected to the spindle in the instant of impact, but in just that moment the drive may carry out an evading maneuver which is being interrupted when the connection between wheel and spindle breaks away. Thus, it is definitely a drawback to construct the protection device or feature in a manner which causes the vehicle to be no longer steerable in the emergency situation.

SUMMARY OF THE INVENTION

It is an object of the present invention to provide for a restraining and impact protection device in motor vehicles which optimizes the bio-mechanical interaction as between device and driver in the case of a collision.

It is a specific object of the present invention to provide for a protection device which, in the case of a collision offers a large, vertically oriented surface to the chest of the driver, while permitting dissipation of energy over a large volume of material that is being deformed in broad surface-to-surface contact with body parts of the driver when propelled against the restraint.

Therefor, it is another object of the present invention to provide for a principle concerning impact protection inside of the steering wheel of a motor vehicle functioning independently from the orientation of the steering column and of the steering wheel.

It is still another object of the present invention to provide for an impact protection device in motor vehicles preventing the driver from having his head thrown against the windshield, i.e. the protection must be effective to restrain forward propelling of the driver above the steering wheel.

It is a further object of the present invention to prevent the head of a driver from hitting the steering wheel in the last phase of an impact when a shoulder harness held back the body of the driver, but not the head.

In accordance with the preferred embodiment of the invention a steering wheel with rim, depressed hub and spokes is provided with a deformable cushion as shock absorbing and impact energy dissipating element which is articulated on the hub and bears against the spokes so that upon bending down of the spokes and lower rim portion of the steering wheel, the upper surface of that element is tilted into a vertical or near vertical disposition. In the preferred form of practicing the invention the dissipating element is mounted on the hub in a ball and socket or ball joint-like arrangement, whereby the ball-part is established for example by a spherical segment on the hub, and the socket part is a spherical recess in the bottom of the shock absorbing element. The relationship could, however, be reversed, with the shock absorber element carrying a ball and the socket defining part being mounted on the hub.

It should be noted, that the tilting of the shock absorbing element depends on the bending down particularly of the lower portion of the steering wheel rim. This however does not impede the maneuverability of the steering. One can still turn the wheel and the steering spindle as connected thereto.

The shock absorbing and impact energy dissipating restraining element should be a thick, single piece having a large surface in and above the steering wheel plane, and being made of strong rigid foam which is not soft-resilient but can undergo plastic deformation. Rigid poly urethane foam for example, can be deformed i.e. compressed by up to 70 to 80 percent of its original thickness without elastic memory. The surface of such a foam element should form a closed skin. Such an element can be deformed under dissipation of energy, i.e. it can be already compressed under an impact force of 500 kiloponds (kilogram - weight), performing deformation work in the compressing and thereby absorbing and dissipating impact energy. The human chest can take up such force without injury. Up to 2000 kilogram weight can be taken in that manner and dissipates if the element is sufficiently thick and can be compressed progressively under consideration of further deformation of the spokes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 6:
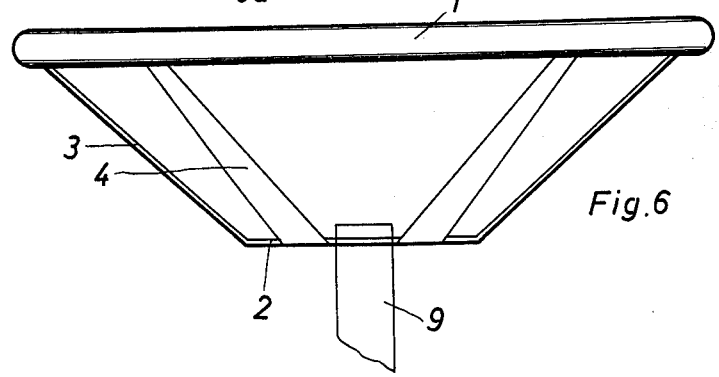
Figure 7:
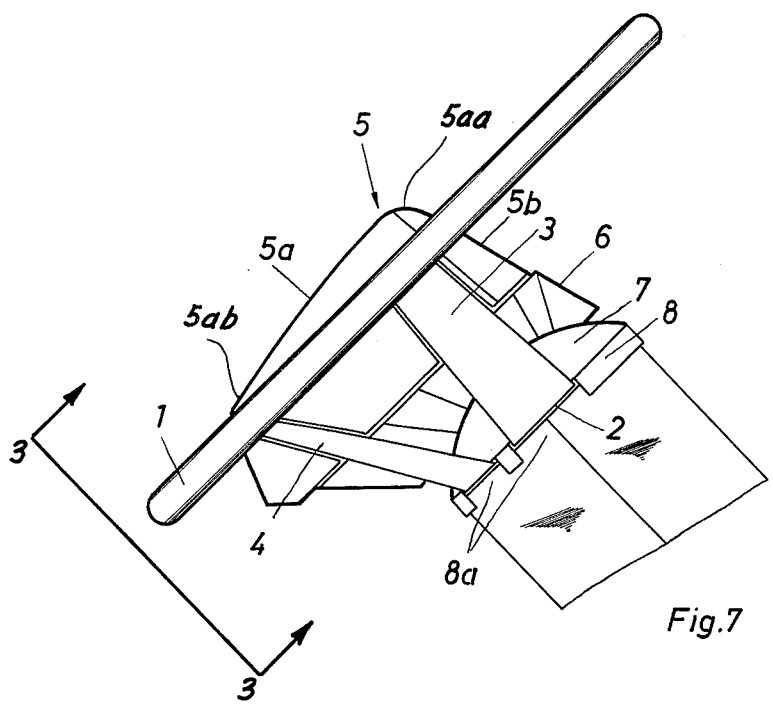
FIG. 7 is a side elevation of the steering wheel of FIGS. 1 through 6 but installed and mounted on the steering column.
Figure 8:
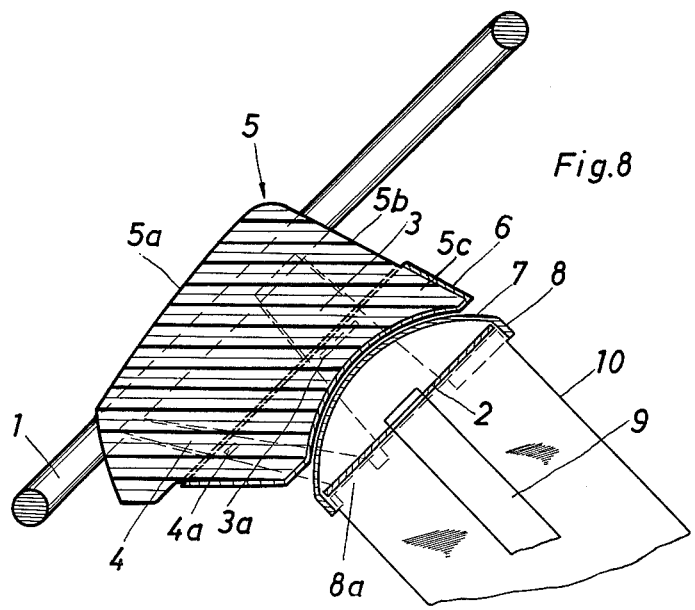
FIG. 8 is a section view through and in a plane parallel to the viewing plane of FIG. 7.

Proceeding now to the detailed description of the drawings, the steering wheel without the protective device is comprised of a rim part 1, a depressed hub 2, wide spokes 3 and narrower support spokes 4. (See FIGS. 2 and 6). The dish-shaped configuration of the steering wheel provides for an internal space in which is disposed a deformable element 5 as impact shock dissipator and cushion, made of rigid foam and having a rather large outwardly oriented surface (FIG. 1) while being quite thick.

The hub 2 of the steering wheel is a circular disk with a central opening for the steering spindle 9. The spokes 3 and 4 extend integrally from that disk 2 and carry the rim 1 basically at its lower half.

The shock dissipator element 5 has an upper portion with a bottom-like rim $5e$ from which extends a bottom portion $5c$ with a completely circular bottom proper. The upper portion has an upwardly and outwardly oriented frustoconical surface portion $5d$ by means of which the dissipator 5 rests firmly on spokes 3 and 4. These spokes as extending from hub 2 define also a cone of like apex angle so that indeed element 5 can rest firmly on the spokes in surface-to-surface contact and well supported disposition.

Figure 1:
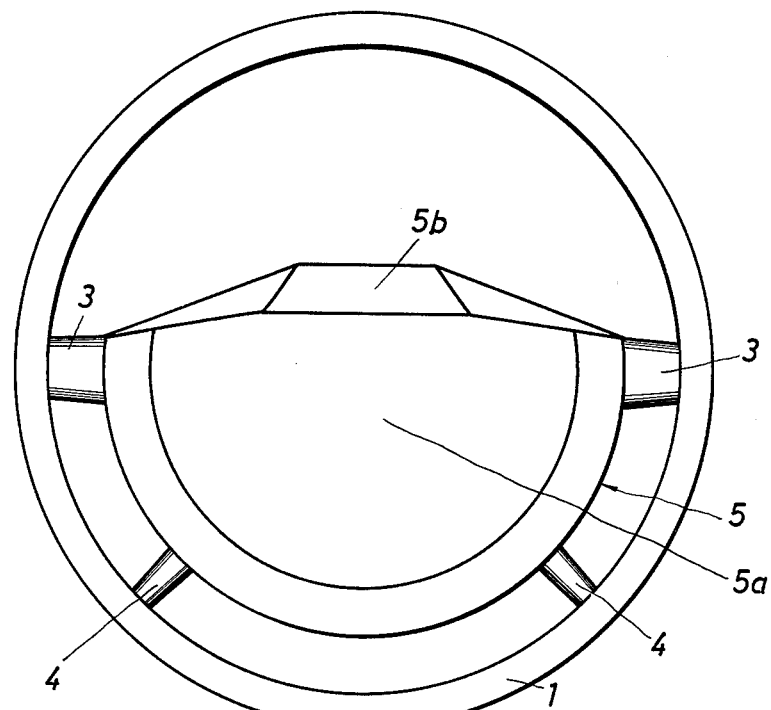
FIG. 1 is a front view of a steering wheel for a motor vehicle showing also the impact protection and restraining device in accordance with the preferred embodiment of the present invention.
Figure 2:
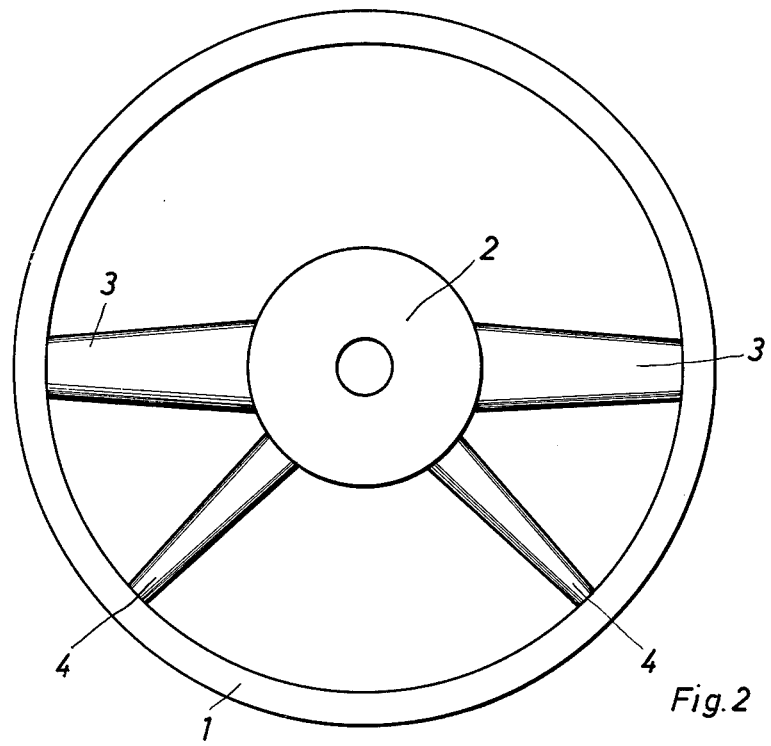
FIG. 2 shows the same steering wheel but the protection device has been removed.
Figure 3:
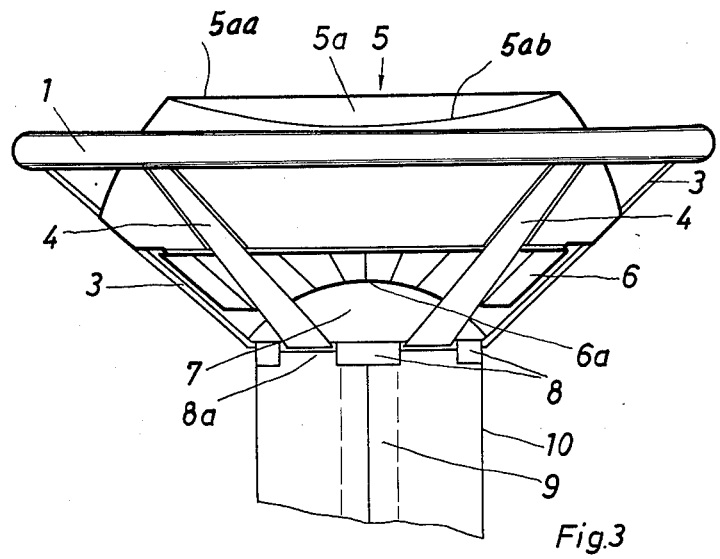
FIG. 3 is a side elevation of the steering wheel as shown in FIGS. 1 and 7 (viewing lines 3—3 in FIG. 7)
Figure 4:
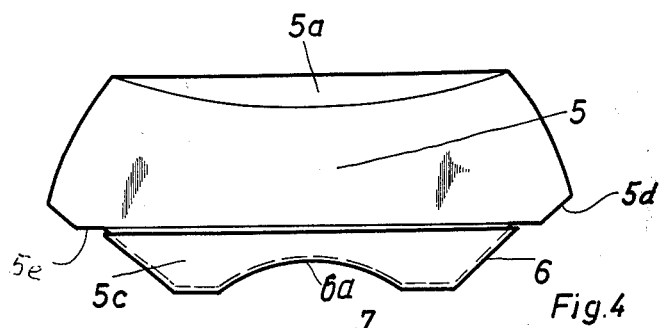
FIGS. 4, 5 and 6 together can be regarded as an exploded side elevation of the three major components as shown in FIG. 3, with FIG. 4 showing the impact disposition, FIG. 5 showing a ball mount for the dissipator, and FIG. 6 showing the steering wheel and can be regarded as side view of FIG. 2.
Figure 5:
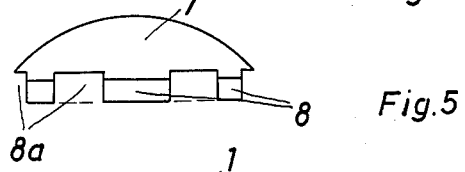

The element 5 has a slightly radially inwardly curving contour in its upper part but fills to a substantial degree the entire lower half of the steering wheel dish, "lower" being understood to refer to within the plane of the rim circle, as seen in FIG. 1. The element 5 leaves, however, sufficient space between its periphery and the rim to permit unrestrained gripping of rim 1 by the driver.

The element 5 as seen in top elevation (FIG. 1) is not completely round but recessed in the upper part to enlarge the viewing range through the upper half of the steering wheel for observation of the instrument panel. The rear or upper end face $5b$ falls rather steeply towards the bottom, thus interrupting the annulus from which bottom part $5c$ extends.

Reference numeral $5a$ refers to the impact area of element 5 having about 300 $cm^2$ for a normal size steering wheel (a little under 50 square inches) and permitting large area interaction between any object hitting it on impact. Shock dissipator 5 is a thick, single piece, large area ($5a$) element made of only plastically deformable, homogenic, rigid polyurethane foam. Upset and deformation hardness and compression force vs. deformation characteristics are determined essentially by its density and volumetric weight.

The semi-circular, large impact area $5a$ is slightly downwardly inclined from its higher extending rear edge $5aa$, until about registering with the lower rim portion, see $5ab$. Thus, the front face $5a$ of dissipator 5 has already a more favorable inclination relative to the driver than the plane of the steering wheel rim.

Dissipator element 5 has a lower concavely tapering bottom portion $5c$ with concave bottom proper. A pan or trough 6 of like configuration receives portion $5c$ and carries element 5 accordingly. Pan 6 is made of plastic or sheet metal and is rather stiff. It engages the portion $5c$ in positive form-fitting relation. Resilient lugs $3a$ and $4a$ on the spokes hold the pan 6. Thus, the pan 6 is also held on the spokes so that the spokes do not only support element 5 directly along rim portion $5d$, but additionally through intervention of the lugs and of the pan as held thereon. The spokes 3 and 4 as extending integrally from that disk 2, do not only carry the rim 1, basically at its lower half, but the inner surface of the spokes support also the body 5 at the frustoconical surface portion $5d$ thereof.

The spokes 3 are about twice as wide as the spokes 4 and are, therefor, differently stiff. The spokes are so arranged that wide spokes 3 extend in diametrically opposed directions, while narrow spokes 4 are arranged in the lower half of the steering wheel, as per orientation shown in FIG. 2, and hold the rim 1 in the desired disposition, together of course with spokes 3. All spokes taper slightly towards rim 1. This arrangement provides for controlled stiffness in the overall spoke arrangement. The two narrower spokes 4 bend under a smaller load than the diametrically extending spokes 3, while spokes 3 twist on a radial axis when spokes 4 are bent down upon bending down of the lower steering wheel rim.

Spindle 9 is contained in steering column 10, and hub 2 is disposed at the upper end of the steering column, having preferably slightly larger diameter than the column 10. A spherical segment 7 is mounted on hub 2. Segment 7 carries the pan 6 in a ball and socket-like joint. As can be seen, element 5 and here particularly bottom portion 5c has a spherical recess; pan 6 has a matching recess 6a which defines the socket portion of the joint and mount. Spherical element 7 is the ball part of that joint. Thus, pan 6 with element 5 is articulatedly mounted on socket part 7 which in turn is mounted on the hub 2.

The principle function of the stiff pan 6 is to avoid direct mounting of the plastic element 5 on the spherical segment 7. Nevertheless, portion 5c together with pan 6 defines the socket portion of this ball and socket mount. It will be appreciated that the tiltability of the assembly 5–6 on spherical segment - socket 7 does not come into play under normal circumstances. The disposition of the pan on the spokes and engagement with lugs 3a and 4a as well as the direct engagement of element 5, via frustoconical surface 5d, with spokes 3 and 4 prevents any tilting displacement of that assembly 5–6. The lugs may hold the pan so that the assembly 5–6 cannot be lifted off the steering wheel.

The outer edge portion of segment 7 is provided with a narrow, cylindrical collar 8 having an inner diameter about equal to the outer diameter of hub 2, so that the caplike element 7 can be slipped over hub 2 and held thereon in press fit. The collar 8 is provided with four differently wide recesses 8a, through which extend the spokes when segment 7 is mounted on hub 2. Collar 8 extends not only over hub 2 and receives the upper portion of steering column 10, but in a clearing disposition.

One can readily see, that segment 7 can easily be placed onto the existing hub and does not in the least interfere with the mounting of the hub, with integral spokes and mounted rim, onto the spindle 9. The arrangement can be assembled in that manner before mounting the dissipator 5.

Figure 9:
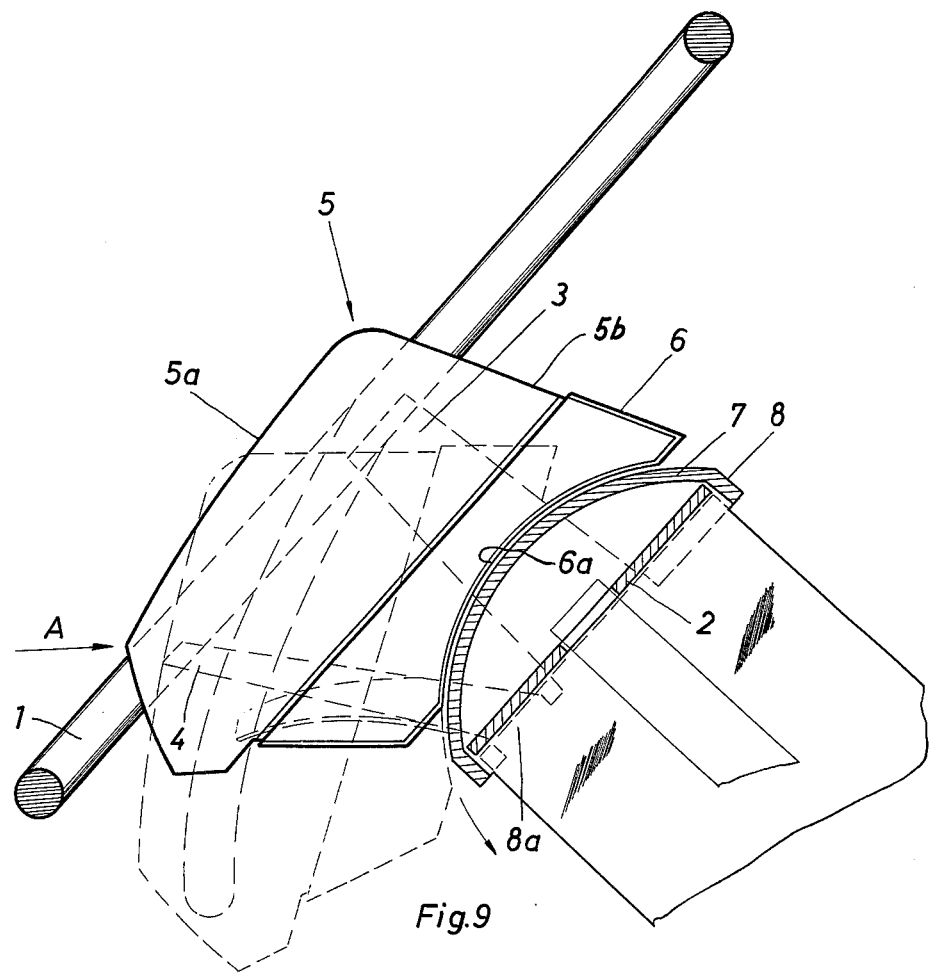
FIG. 9 shows the same section of FIG. 8 but on an enlarged scale with phantom lines indicating disposition changes in the case of a collision impact of the vehicle.

Pan 6 mounts element 5 on segment 7 in such a manner, that the orientation of the mutually engaging calotte surfaces permits changes in the orientation of element 6 if the spokes 4 are bent down so that element 5 tilts its front face 5a in a more vertical disposition while remaining seated on segment 7 (see FIG. 9).

Considering the impact situation more fully, the following can be derived from the drawings. Normally, pan 6 with appropriate contour sits on segment 7 in an articulated mount-like fashion. As stated, articulated movement, however, is not permitted, because the pan rests also on spokes 3 and 4 and tongues 3a, 4a secure the pan thereto.

The dissipator element 5 as seated in the trough 6 in form fitting disposition projects slightly above the rim 1 of the steering wheel except that its upper surface 5a is already steeper than the plane of the wheel.

In the case of an impact (arrow A) the driver will bend the lower portion of the steering wheel down twisting spokes 3 and bending down spokes 4. However, the assembly 5–6 remains in engagement with spokes 4, even if tongues 3a and 4b may disengage. The bending down of spokes 4 should be more accurately defined. The arrow A of driver acceleration relative to the vehicle occurs at an angle to the plane of the steering wheel as well as to the direction transverse to that plane which is the direction of the column, as well as the direction in relation to which the hub 2 is depressed relative to rim 1 of the steering wheel. Bending of spokes 4 occurs under the gripping force of the driver acting therefor in direction of arrow A. The bending has a radially outwardly directed component as well as a component in direction towards the steering wheel column. That in turn results in a down bending of rim and spokes 4 while spokes 3 are twisted.

As spokes 4 are bent down, the lower support for assembly 5–6, in fact, recedes and that in turn permits down tilting of pan 6 on segment 7, thereby changing the orientation of element 5, and its upper face 5a is tilted to a near vertical disposition as shown in dotted lines in FIG. 9. Since this bending of the steering wheel occurs before any body part of the driver hits element 5, the latter has the desired vertical disposition and orientation when the impact occurs. The impact occurs, therefor, in broad surface-to-surface contact and not just at a narrow edge as projecting towards the driver before the steering wheel was bent. Thus, without tilting of the element 5 into a vertical disposition of its impact surface 5a, little deformation work would be performed by the element and little energy would be dissipated accordingly. The vertical disposition of the surface 5a of element 5 when intercepting the body of the driver ensures energy dissipation over a large zone without local concentration and corresponding localized reaction with the driver's body. The broad surface contact between driver body and element 5 ensures also that a large volume of the element 5 is compressed and performs deforming work so that large amounts of impact energy are dissipated.

One can see further that the function of the absorbing device is not impeded for considerable deflection angles of the steering wheel, because of the multidirectional tilt permitted for the assembly 5–6. On the other hand the steerability is not impeded by the operation and function of the shock and impact absorber and dissipator assembly 5–6. Bending of the steering wheel rim and of spokes 4 as well as twisting of spokes 3 does not prevent turning of the hub and of the spindle via rim 1, the assembly 5–6 does not interfer.

The invention is not limited to the embodiments described above but all changes and modifications thereof not constituting departures from the spirit and scope of the invention are intended to be included.

We claim:

1. Shock absorbing arrangement for impact protection and driver restraint in a steering wheel for motor vehicles, the wheel having a depressed hub and a rim held by spokes extending radially outwardly and upwardly from the hub to the rim, comprising:

a shock dissipating and absorbing deformable element having a contour to bear againt the spokes and being held by and on the spokes; and means for mounting the element on the hub for tilting of the element on the hub, at least one of the spokes being sufficiently flexible, so that the element as mounted tilts on and relative to the hub, whereby the upper surface of the element facing the driver tilts relative to the plane of a normal disposition the steering wheel has relative to the hub, such tilting of the element resulting from tilting of the rim, whereby at least one of the spokes against which the element bears and continues to bear is being bent radially outwardly and in a direction running transverse to the plane of the steering wheel rim and toward the hub; said element as mounted tilting independently from the tilting of the rim relative to the hub.

2. Shock absorbing arrangement as in claim 1, wherein the means for mounting includes a ball and socket mount as between the hub and the element.

3. Shock absorbing arrangement as in claim 2, the ball and socket mount including a pan for holding the bottom portion of the element.

4. Arrangement as in claim 1, wherein the means for mounting includes a spherical segment on the hub, the element having a concave bottom for articulated seating on the segment.

5. Arrangement as in claim 4 and including a mounting pan holding the element and being articulatedly mounted on the hub.

6. Arrangement as in claim 4, the hub being a flat disk, the segment provided with a receiving collar slipped onto the disk and held thereon, the collar having recesses traversed by the spokes as extending from the hub.

7. Arrangement as in claim 1, wherein the element is flexibly secured to at least some of the spokes.

8. Shock absorbing arrangement as in claim 1, wherein the element is a body made of a non-elastic, homogenic, deformable foam.

9. Arrangement as in claim 8, wherein the element is made of polyurethane foam.

10. Arrangement as in claim 8, and including a mounting pan holding the foam body and being articulatedly mounted on the hub.

11. Shock absorbing arrangement for impact protection and driver restraint in a steering wheel for motor vehicles, the wheel having a depressed hub and a rim held by spokes extending radially outwardly and upwardly from the hub to the rim, comprising:

a shock absorbing and dissipating element made of rigid foam and having a substantially flat upper surface contour;

a ball and socket-like mount with articulated and interengaging concave-convex surfaces for mounting the element on the hub so that the element may tilt relative to the hub, the element normally resting on the spokes in dispositions radially displaced from the ball and socket-like mount without tilting; the element tilting relative to the hub when locations of engagement of the spokes with the element as well as the rim of the wheel as held by the spokes are tiltably displaced relative to the hub, whereby the element tilts independently from the tiltable displacement of the rim by operation of said ball and socket mount while continuing to be held by the spokes.

* * * * *